US008072189B2

(12) United States Patent
Sakurai et al.

(10) Patent No.: US 8,072,189 B2
(45) Date of Patent: Dec. 6, 2011

(54) CHARGE AND DISCHARGE CONTROL CIRCUIT AND BATTERY DEVICE

(75) Inventors: Atsushi Sakurai, Chiba (JP); Kazuaki Sano, Chiba (JP)

(73) Assignee: Seiko Instruments Inc., Chiba (JP)

( * ) Notice: Subject to any disclaimer, the term of this patent is extended or adjusted under 35 U.S.C. 154(b) by 484 days.

(21) Appl. No.: 12/409,967

(22) Filed: Mar. 24, 2009

(65) Prior Publication Data
US 2009/0243546 A1 Oct. 1, 2009

(30) Foreign Application Priority Data

Mar. 31, 2008 (JP) .................. 2008-089766

(51) Int. Cl.
*H02J 7/04* (2006.01)
*H02J 7/16* (2006.01)
*H02J 7/00* (2006.01)
*G01R 19/14* (2006.01)
*H01H 50/54* (2006.01)

(52) U.S. Cl. ........ 320/165; 320/134; 320/136; 324/133; 361/245

(58) Field of Classification Search .................. 320/165, 320/134, 136, DIG. 15, DIG. 20
See application file for complete search history.

(56) References Cited

U.S. PATENT DOCUMENTS

| 5,229,635 | A | * | 7/1993 | Bessolo et al. | 257/360 |
|---|---|---|---|---|---|
| 5,504,361 | A | * | 4/1996 | Blossfeld | 257/355 |
| 5,539,610 | A | * | 7/1996 | Williams et al. | 361/246 |
| 6,429,550 | B1 | * | 8/2002 | Braun et al. | 307/127 |
| 6,724,593 | B1 | * | 4/2004 | Smith | 361/84 |
| 7,312,653 | B2 | * | 12/2007 | Chen et al. | 327/545 |
| 7,629,775 | B2 | * | 12/2009 | Nishida | 320/165 |
| 7,791,315 | B2 | * | 9/2010 | Sakurai et al. | 320/134 |
| 2008/0224664 | A1 | * | 9/2008 | Sano et al. | 320/134 |

FOREIGN PATENT DOCUMENTS

JP 2006-210026 A 8/2006

* cited by examiner

*Primary Examiner* — Patrick Assouad
*Assistant Examiner* — Nathaniel Pelton
(74) *Attorney, Agent, or Firm* — Brinks Hofer Gilson & Lione

(57) ABSTRACT

Provided are a charge and discharge control circuit capable of reducing a circuit size, and a battery device. In a charger reverse connection detection circuit (116), a comparison circuit or the like is not used, and two NMOS transistors are used, whereby circuit sizes of the reverse connection detection circuit (116) and a charge and discharge control circuit (110) are reduced. Accordingly, a consumption current is reduced, and a manufacturing cost is also reduced.

6 Claims, 4 Drawing Sheets

CHARGE AND DISCHARGE CONTROL CIRCUIT AND BATTERY DEVICE

RELATED APPLICATIONS

This application claims priority under 35 U.S.C. §119 to Japanese Patent Application No. JP2008-089766 filed on Mar. 31, 2008, the entire content of which is hereby incorporated by reference.

BACKGROUND OF THE INVENTION

1. Field of the Invention

The present invention relates to a charge and discharge control circuit which controls charge and discharge of a battery, and to a battery device.

2. Description of the Related Art Recently, various portable electronic devices have become widespread. Those portable electronic devices are usually driven by a battery device onto which a battery is mounted.

The battery is connected to the portable electronic device when the portable electronic device is used, and the battery is connected to a charger when the battery is charged. Here, as a dangerous condition of the battery, there exists a state of a reverse-connected charger, in which the charger is connected to the battery with its polarities being reversed to those of the battery when the battery is charged.

As measures against this, there is proposed a technology in which, when the charger is connected to the battery with its polarities being reversed to those of the battery, and accordingly a voltage of a detection terminal becomes higher than a power supply voltage and a comparison circuit detects the above, discharge of the battery is stopped (for example, see JP 2006-210026 A).

However, the comparison circuit is used in such a case as described above, which correspondingly increases a circuit size. Accordingly, a consumption current is increased, and the manufacturing cost is also increased.

SUMMARY OF THE INVENTION

The present invention has been made in view of the above-mentioned problems, and therefore, it is an object of the present invention to provide a charge and discharge control circuit which is capable of reducing a circuit size, and a battery device.

In order to achieve the above-mentioned object, the present invention provides a charge and discharge control circuit formed on a second-conductivity-type substrate, for controlling charge and discharge of a battery including a second-conductivity-type first MOS transistor and a second-conductivity-type second MOS transistor which are provided on a charge and discharge path, the charge and discharge control circuit including: a detection terminal for detecting that a charger is connected to the battery with polarities thereof being reversed to polarities of the battery; and a charger reverse connection detection circuit including: an input terminal provided to the detection terminal; an output terminal; a first parasitic bipolar transistor including a second-conductivity-type base provided to a first power source terminal and a first-conductivity-type emitter provided to the input terminal; and a second parasitic bipolar transistor including a first-conductivity-type base provided to a first-conductivity-type collector of the first parasitic bipolar transistor, a second-conductivity-type emitter provided to a second power supply terminal via a resistance component, and a second-conductivity-type collector provided to the first power supply terminal, in which the charger reverse connection detection circuit, when a voltage of the input terminal is equal to or higher than a voltage determined by adding a threshold voltage of a diode to a power supply voltage, operates so as to turn on the second-conductivity-type first MOS transistor which is turned on to cause a charge and discharge current to flow and is turned off to cause only a discharge current of a first parasitic diode to flow, and operates so as to turn off the second-conductivity-type second MOS transistor which is turned on to cause the charge and discharge current to flow and is turned off to cause only a charge current of a second parasitic diode to flow, to stop the discharge of the battery.

Further, in order to achieve the above-mentioned object, the present invention provides a battery device including: a charge and discharge control circuit formed on a second-conductivity-type substrate, for controlling charge and discharge of a battery including a second-conductivity-type first MOS transistor and a second-conductivity-type second MOS transistor which are provided on a charge and discharge path; a detection terminal for detecting that a charger is connected to the battery with polarities thereof being reversed to polarities of the battery; a charger reverse connection detection circuit including: an input terminal provided to the detection terminal; an output terminal; a first parasitic bipolar transistor including a second-conductivity-type base provided to a first power source terminal and a first-conductivity-type emitter provided to the input terminal; and a second parasitic bipolar transistor including a first-conductivity-type base provided to a first-conductivity-type collector of the first parasitic bipolar transistor, a second-conductivity-type emitter provided to a second power supply terminal via a resistance component, and a second-conductivity-type collector provided to the first power supply terminal; the second-conductivity-type first MOS transistor; the second-conductivity-type second MOS transistor; and the battery, in which the charger reverse connection detection circuit, when a voltage of the input terminal is equal to or higher than a voltage determined by adding a threshold voltage of a diode to a power supply voltage, operates so as to turn on the second-conductivity-type first MOS transistor which is turned on to cause a charge and discharge current to flow and is turned off to cause only a discharge current of a first parasitic diode to flow, and operates so as to turn off the second-conductivity-type second MOS transistor which is turned on to cause the charge and discharge current to flow and is turned off to cause only a charge current of a second parasitic diode to flow, to stop the discharge of the battery.

In the present invention, a comparison circuit or the like is not used in the charger reverse connection detection circuit, and hence circuit sizes of the charger reverse connection detection circuit and the charge and discharge control circuit are reduced.

DETAILED DESCRIPTION OF THE PREFERRED EMBODIMENTS

Hereinafter, with reference to the drawings, embodiments of the present invention are described.

First Embodiment

Figure 1:
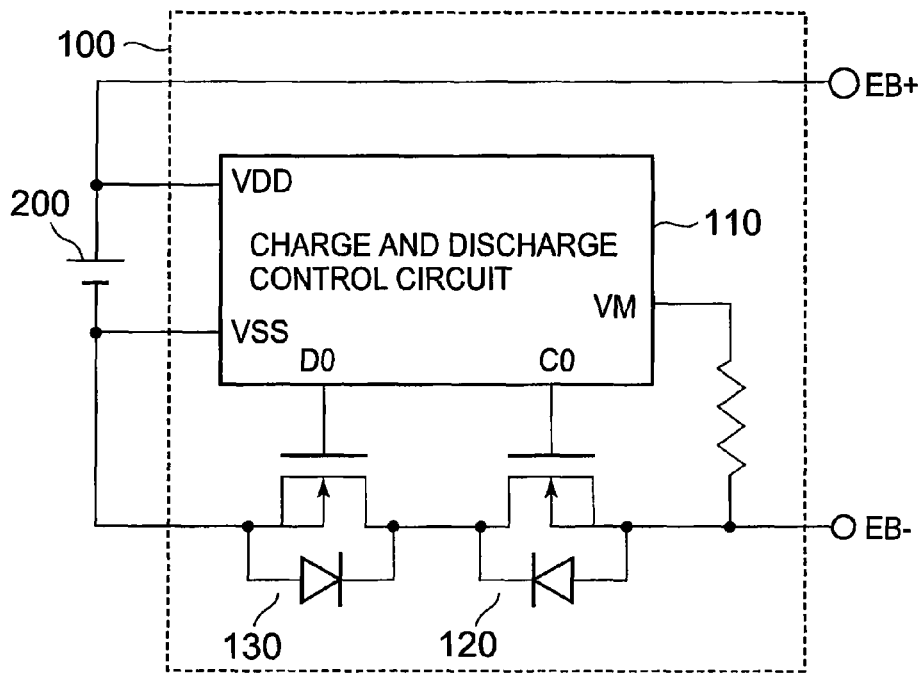
FIG. 1 is a block diagram illustrating a battery device.
Figure 2:
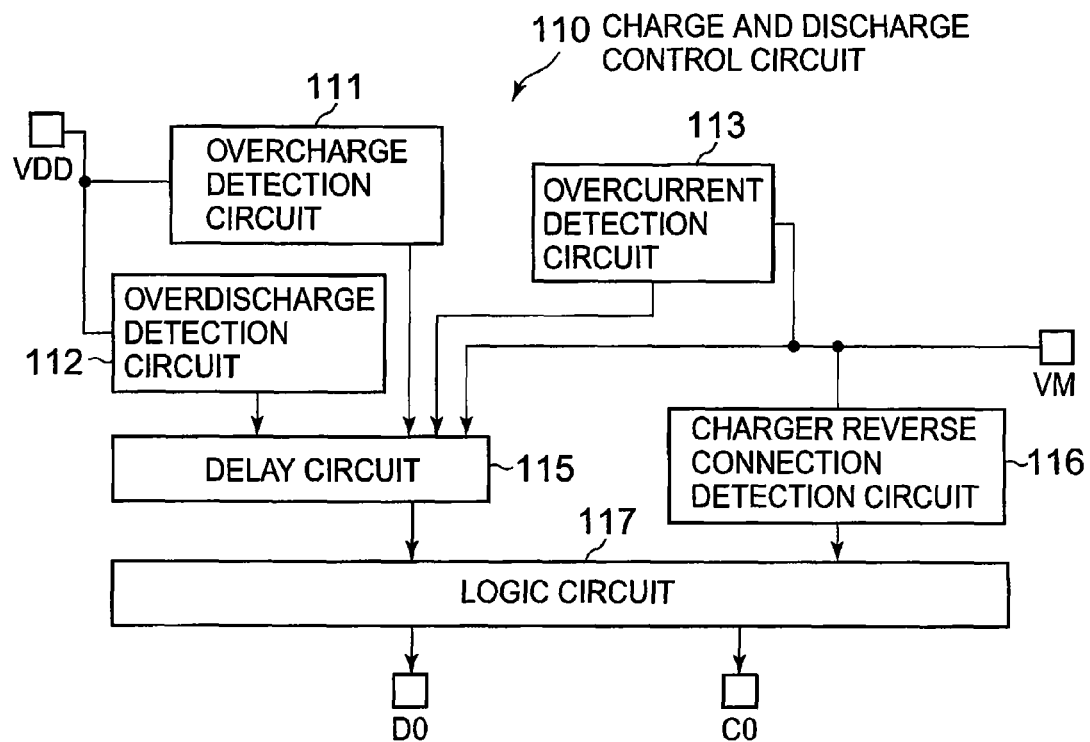
FIG. 2 is a block diagram illustrating a charge and discharge control circuit.

First, a configuration of a battery device is described. FIG. 1 is a block diagram illustrating the battery device. FIG. 2 is a block diagram illustrating a charge and discharge control circuit.

The battery device supplies a power supply voltage to a load (not shown) or is charged by a charger (not shown). A protection circuit 100 protects a battery 200. A charge and discharge control circuit 110 performs on/off control on an NMOS transistor 120 and an NMOS transistor 130, thereby controlling charge and discharge of the battery 200.

The battery device includes the protection circuit 100 and the battery 200. The battery device includes a terminal EB+ and a terminal EB−. The protection circuit 100 includes the charge and discharge control circuit 110, the NMOS transistor 120, and the NMOS transistor 130. The charge and discharge control circuit 110 includes an overcharge detection circuit 111, an overdischarge detection circuit 112, an overcurrent detection circuit 113, a delay circuit 115, a charger reverse connection detection circuit 116, and a logic circuit 117. The charge and discharge control circuit 110 includes a power supply terminal VDD, a ground terminal VSS, a control terminal DO, a control terminal CO, and a detection terminal VM. In the battery 200, a positive terminal thereof is connected to the terminal EB+ and the power supply terminal VDD, and a negative terminal thereof is connected to the ground terminal VSS and is further connected to the terminal E− via the NMOS transistor 120 and the NMOS transistor 130. In other words, the NMOS transistor 120 and the NMOS transistor 130 are provided on a charge and discharge path. In the charge and discharge control circuit 110, the control terminal DO is connected to the NMOS transistor 130, the control terminal CO is connected to the NMOS transistor 120, and the detection terminal VM is connected to the terminal EB−. In the overcharge detection circuit 111, one terminal thereof is connected to the power supply terminal VDD, and the other terminal thereof is connected to a first input terminal of the delay circuit 115. In the overdischarge detection circuit 112, one terminal thereof is connected to the power supply terminal VDD, and the other terminal thereof is connected to a second input terminal of the delay circuit 115. In the overcurrent detection circuit 113, one terminal thereof is connected to the detection terminal VM, and the other terminal thereof is connected to a third input terminal of the delay circuit 115. An output terminal of the delay circuit 115 is connected to a first input terminal of the logic circuit 117. In the charger reverse connection detection circuit 116, one terminal thereof is connected to the detection terminal VM, and the other terminal thereof is connected to a second input terminal of the logic circuit 117. A first output terminal of the logic circuit 117 is connected to the control terminal CO, and a second output terminal thereof is connected to the control terminal DO. In addition, the charger or the load is connected between the terminal EB+ and the terminal EB−.

Here, the detection terminal VM is a terminal for detecting that the battery 200 is in an overcurrent state. Moreover, the detection terminal VM is a terminal for detecting that the charger is connected to the battery 200 with its polarities being reversed to those of the battery 200.

The charge and discharge control circuit 110 is formed on an n-type substrate.

Next, an operation of the charge and discharge control circuit 110 is described.

(Case where the battery 200 is in an overcharged state)

When a voltage of the battery 200 becomes high to be equal to or higher than a predetermined voltage, and the battery 200 is in the overcharged state, the overcharge detection circuit 111 monitors the power supply terminal VDD and detects that the battery 200 is being overcharged. Then, after a delay time (for example, a second) set by the delay circuit 115 has elapsed while the battery 200 is being in the overcharged state, that is, when a time of the overcharged state of the battery 200 is equal to or longer than the delay time, the logic circuit 117 outputs a low signal and a high signal to a gate of the NMOS transistor 120 and a gate of the NMOS transistor 130, respectively. Then, the NMOS transistor 120 is turned off and causes only a discharge current to flow by means of a parasitic diode, and the NMOS transistor 130 is turned on and causes a charge and discharge current to flow, whereby the overcharge detection circuit 111 stops charge of the battery 200.

(Case Where the Battery 200 is in an Overdischarged State)

When the voltage of the battery 200 becomes low to be lower than the predetermined voltage, and the battery 200 is in the overdischarged state, the overdischarge detection circuit 112 monitors the power supply terminal VDD and detects that the battery 200 is being overdischarged. Then, after a delay time set by the delay circuit 115 has elapsed while the battery 200 is being in the overdischarged state, that is, when a time of the overdischarged state of the battery 200 is equal to or longer than the delay time, the logic circuit 117 outputs the high signal and the low signal to the gate of the NMOS transistor 120 and the gate of the NMOS transistor 130, respectively. Then, the NMOS transistor 120 is turned on and causes the charge and discharge current to flow, and the NMOS transistor 130 is turned off and causes only a charge current to flow by means of the parasitic diode, whereby the overdischarge detection circuit 112 stops discharge of the battery 200.

(Case where the battery 200 is in the overcurrent state)

When an abnormal amount of current flows to the load, and the battery 200 is in the overcurrent state, the overcurrent detection circuit 113 monitors the detection terminal VM and detects that the battery 200 causes an overcurrent to flow. Then, after a delay time set by the delay circuit 115 has elapsed while the battery 200 is being in the overcurrent state, that is, when a time of the overcurrent state of the battery 200 is equal to or longer than the delay time, the logic circuit 117 outputs the high signal and the low signal to the gate of the NMOS transistor 120 and the gate of the NMOS transistor 130, respectively. Then, the NMOS transistor 120 is turned on and causes the charge and discharge current to flow, and the NMOS transistor 130 is turned off and causes only the charge current to flow by means of the parasitic diode, whereby the overcurrent detection circuit 113 stops the discharge of the battery 200.

(Case Where the Charger is Connected to the Battery 200 with its Polarities Being Reversed to Those of the Battery 200)

When the charger is connected to the battery 200 to charge the battery 200, a positive terminal and a negative terminal of the charger are connected to the terminal EB+ and the terminal EB−, respectively. However, when the charger is mistakenly connected to the battery 200, the positive terminal and the negative terminal of the charger are connected to the terminal EB− and the terminal EB+, respectively. Specifically, the charger is connected to the battery 200 with their polarities being reversed to those of the battery 200. Then, voltages of the detection terminal VM and the terminal EB−, which are usually around a ground voltage, become around the power supply voltage which is a voltage of the battery 200. When the voltage of the detection terminal VM is equal to the predetermined voltage, the charger reverse connection detection circuit 116 detects that the voltage of the detection terminal VM is equal to the predetermined voltage, and the logic circuit 117 outputs the high signal and the low signal to the gates of the NMOS transistor 120 and the NMOS transistor 130, respectively. On this occasion, there is no delay time between the detection of the fact that the voltage of the detection terminal VM is equal to the predetermined voltage and the output of the high signal and the low signal. Then, the NMOS transistor 120 is turned on and causes the charge and discharge current to flow, and the NMOS transistor 130 is turned off and causes only the charge current to flow by means of the parasitic diode, whereby the charger reverse connection detection circuit 116 stops the discharge of the battery 200. Note that there is no delay time between the detection of the fact that the voltage of the detection terminal VM is equal to the predetermined voltage and the output of the high signal and the low signal, but there may be a delay time which is shorter than the delay time in the case where the battery 200 is in the overcharged state, the overdischarged state, or the overcurrent state.

Figure 3:
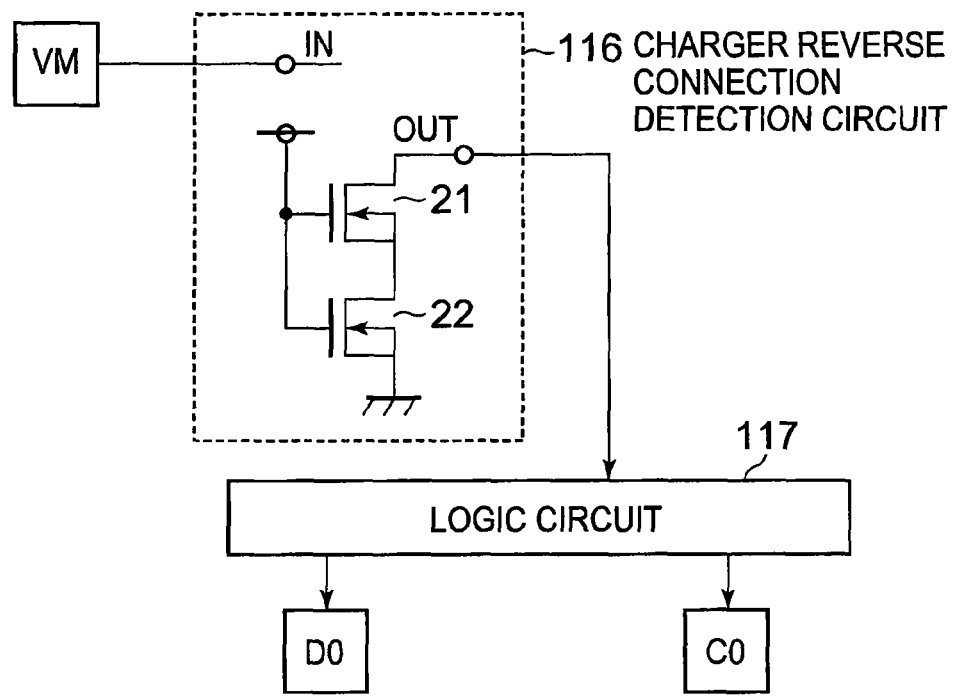
FIG. 3 is a circuit diagram illustrating a charger reverse connection detection circuit.
Figure 4:
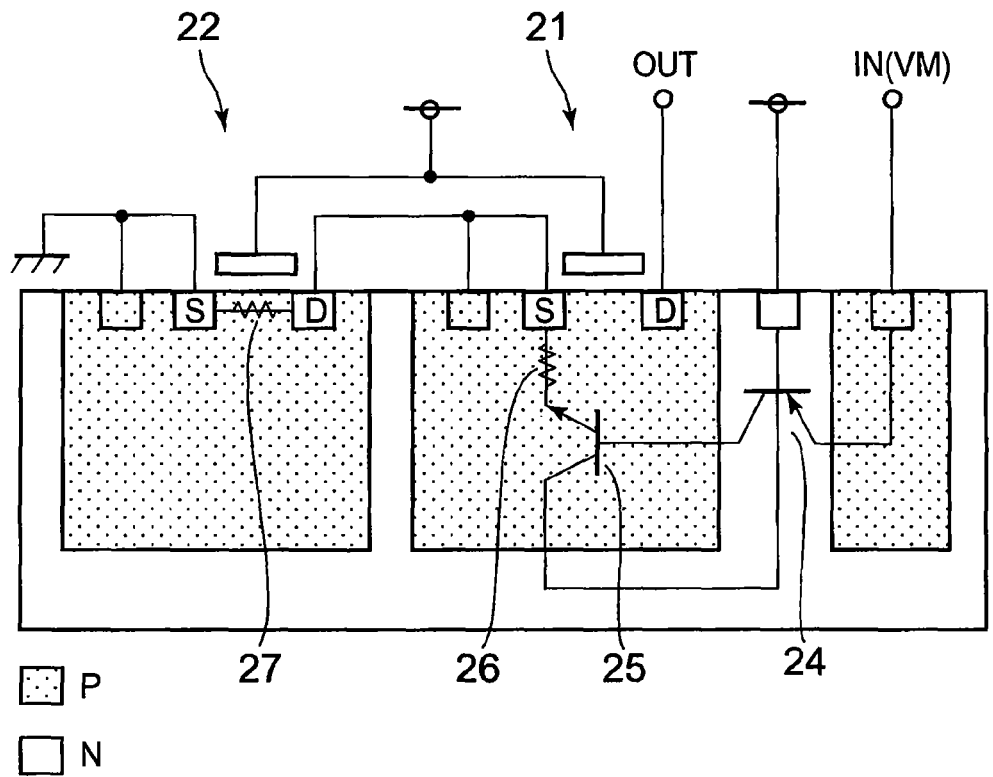
FIG. 4 is a device cross-sectional view illustrating the charger reverse connection detection circuit.

Next, a configuration of the charger reverse connection detection circuit 116 is described. FIG. 3 is a circuit diagram illustrating the charger reverse connection detection circuit. FIG. 4 is a device cross-sectional view illustrating the charger reverse connection detection circuit.

The charger reverse connection detection circuit 116 includes NMOS transistors 21 and 22.

The charger reverse connection detection circuit 116 further includes a parasitic PNP bipolar transistor 24, a parasitic NPN bipolar transistor 25, and parasitic resistors 26 and 27.

In the NMOS transistor 21, a gate thereof is connected to the power supply terminal VDD, a source and a back gate thereof are connected to a drain of the NMOS transistor 22, and a drain thereof is connected to an output terminal OUT. In the NMOS transistor 22, a gate thereof is connected to the power supply terminal VDD, and a source and a back gate thereof are connected to the ground terminal VSS.

In the parasitic PNP bipolar transistor 24, a base thereof is connected to the power supply terminal VDD, an emitter thereof is connected to an input terminal IN (detection terminal VM), and a collector thereof is connected to a base of the parasitic NPN bipolar transistor 25. In the parasitic NPN bipolar transistor 25, an emitter thereof is connected to the source of the NMOS transistor 21 via the parasitic resistor 26, and a collector thereof is connected to the power supply terminal VDD. The parasitic resistor 27 is located between the source and the drain of the NMOS transistor 22.

Next, an operation of the charger reverse connection detection circuit 116 is described.
(Case Where the Charger is Connected to the Battery 200 Normally)

A voltage of the input terminal IN (detection terminal VM) is around the ground voltage. The power supply voltage is input to the gates of the NMOS transistors 21 and 22, whereby the NMOS transistors 21 and 22 are turned on. Then, a voltage of the output terminal OUT is converted into the low signal (ground voltage). That is, the charger reverse connection detection circuit 116 does not detect that the charger is connected to the battery 200 with its polarities being reversed to those of the battery.
(Case Where the Charger is Connected to the Battery 200 with its Polarities Being Reversed to Those of the Battery)

It is assumed here that, in a first parasitic diode, a p-type well connected to the input terminal IN (detection terminal VM) is an anode, and an n-type substrate connected to the power supply terminal VDD is a cathode. It is assumed that, in the parasitic PNP bipolar transistor 24, an n-type substrate connected to the power supply terminal VDD is the base, a p-type well connected to the input terminal IN (detection terminal VM) is the emitter, and a p-type well connected to the back gate of the NMOS transistor 21 is the collector. It is assumed that, in a second parasitic diode, a p-type well connected to the back gate of the NMOS transistor 21 is an anode, and an n-type source region connected to the ground terminal via the NMOS transistor 22 is a cathode. It is assumed that, in the parasitic NPN bipolar transistor 25, a p-type well connected to the back gate of the NMOS transistor 21 is the base, an n-type source region connected to the ground terminal via the NMOS transistor 22 is the emitter, and an n-type substrate connected to the power supply terminal VDD is the collector.

A voltage of the input terminal IN (detection terminal VM) becomes high to be equal to or higher than a voltage obtained by adding a threshold voltage of the parasitic diode to the power supply voltage, whereby the first parasitic diode operates and causes a parasitic current to flow. The parasitic PNP bipolar transistor 24 operates in response to the parasitic current and causes a parasitic current to flow. When the parasitic current of the parasitic PNP bipolar transistor 24 flows through the second parasitic diode, the parasitic NPN bipolar transistor 25 operates and causes an amplified parasitic current to flow. The amplified parasitic current flows through the parasitic resistors 26 and 27 and wiring (resistance component), whereby a voltage is generated in the parasitic resistors 26 and 27 and the wiring. As a result, a drain voltage of the NMOS transistor 21 becomes high, and is converted into a high signal with respect to the logic circuit 117 when the drain voltage is equal to or higher than a predetermined voltage. In other words, the charger reverse connection detection circuit 116 detects that the charger is connected to the battery 200 with its polarities being reversed to those of the battery.

Accordingly, the comparison circuit or the like is not used but two NMOS transistors are used in the charger reverse connection detection circuit 116, which reduces the circuit sizes of the charger reverse connection detection circuit 116 and the charge and discharge control circuit 110. As a result, a consumption current is reduced, and a manufacturing cost is also reduced.

Further, the comparison circuit or the like is not used in the charger reverse connection detection circuit 116, and hence there is no fear that the comparison circuit or the like malfunctions through operations of the parasitic diode and the parasitic bipolar transistor. For this reason, reliability of the charger reverse connection detection circuit 116 is enhanced.

Note that a resistor (not shown) may be added between the source of the NMOS transistor 21 and the ground terminal VSS. In such a case, the voltage of the output terminal OUT of the charger reverse connection detection circuit 116 becomes higher by an amount of the resistor.

In the first embodiment of the present invention, the n-type substrate is used, the NMOS transistors 21 and 22 are provided between the output terminal OUT and the ground terminal VSS, and the gates of the NMOS transistors 21 and 22 are connected to the power source terminal. In this case, two NMOS transistors are provided between the terminal EB− and the battery 200. Further, when the voltage of the detection terminal VM provided at the terminal EB− is equal to or higher than the voltage obtained by adding the threshold voltage of the parasitic diode to the power supply voltage, the charger reverse connection detection circuit 116 detects that the charger is connected to the battery 200 with its polarities being reversed to those of the battery. However, a p-type substrate (not shown) may be used, two PMOS transistors (not shown) may be provided between the power supply terminal VDD and the output terminal OUT, and gates thereof may be connected to the ground terminal. In such a case, two PMOS transistors are provided between the terminal EB+ and the battery. Further, when the voltage of the detection terminal VM provided at the terminal EB+ is smaller than a voltage obtained by subtracting the threshold voltage of the parasitic diode from the ground voltage, the charger reverse connection detection circuit detects that the charger is connected to the battery with its polarities being reversed to those of the battery.

Second Embodiment

Figure 5:
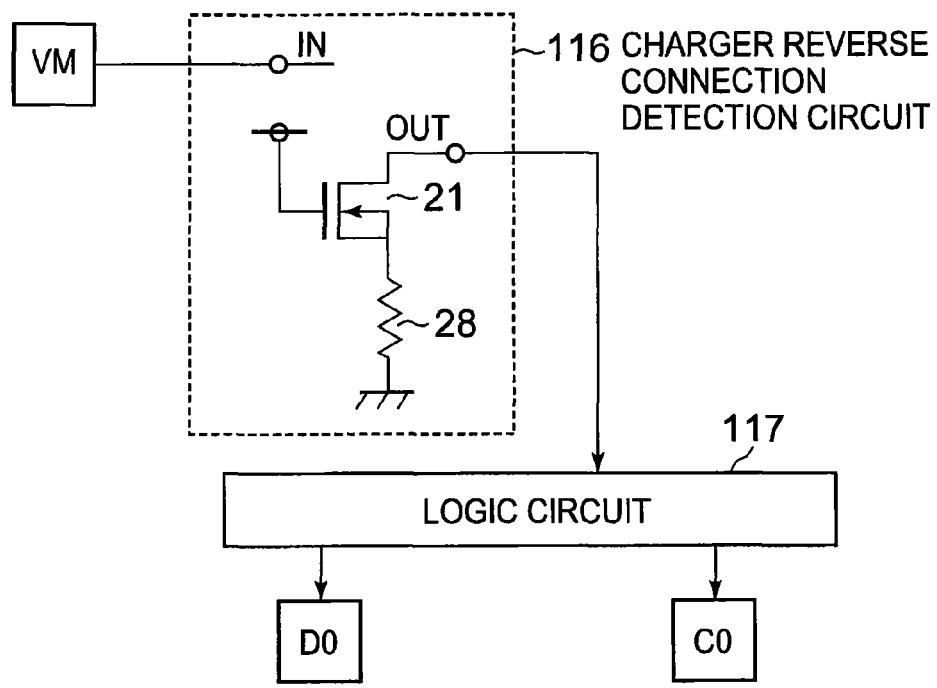
FIG. 5 is a circuit diagram illustrating another charger reverse connection detection circuit.
Figure 6:
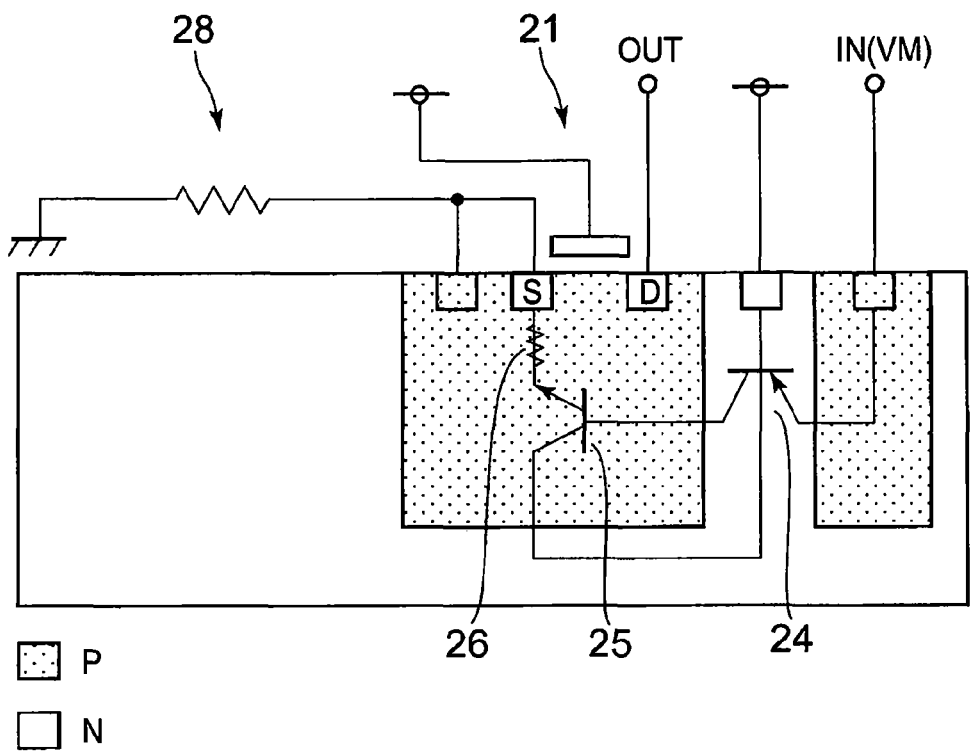
FIG. 6 is a device cross-sectional view illustrating the another charger reverse connection detection circuit.

Next, a configuration of the charger reverse connection detection circuit 116 is described. FIG. 5 is a circuit diagram illustrating the charger reverse connection detection circuit. FIG. 6 is a device cross-sectional view illustrating the charger reverse connection detection circuit.

Compared with the first embodiment, the NMOS transistor 22 is replaced by a pull-down resistor 28 and the parasitic resistor 27 is removed in the charger reverse connection detection circuit 116 according to a second embodiment of the present invention. The pull-down resistor 28 is provided between the source of the NMOS transistor 21 and the ground terminal.

Next, an operation of the charger reverse connection detection circuit 116 is described.
(Case Where the Charger is Connected to the Battery 200 Normally)

A voltage of the input terminal IN (detection terminal VM) is around the ground voltage. The power supply voltage is input to the gate of the NMOS transistor 21, whereby the NMOS transistor 21 is turned on. Then, a voltage of the output terminal OUT is converted into the low signal (ground voltage). That is, the charger reverse connection detection circuit 116 does not detect that the charger is connected to the battery 200 with its polarities being reversed to those of the battery.
(Case Where the Charger is Connected to the Battery 200 with its Polarities Being Reversed to Those of the Battery)

A voltage of the input terminal IN (detection terminal VM) becomes high to be equal to or higher than a voltage obtained by adding a threshold voltage of the parasitic diode to the power supply voltage, whereby the first parasitic diode operates and causes a parasitic current to flow. The parasitic PNP bipolar transistor 24 operates in response to the parasitic current and causes a parasitic current to flow. When the parasitic current of the parasitic PNP bipolar transistor 24 flows through the second parasitic diode, the parasitic NPN bipolar transistor 25 operates and causes an amplified parasitic current to flow. The amplified parasitic current flows through the parasitic resistor 26, the pull-down resistor 28, and wiring (resistance component), whereby a voltage is generated in the parasitic resistor 26, the pull-down resistor 28, and the wiring. As a result, a drain voltage of the NMOS transistor 21 becomes high, and is converted into a high signal with respect to the logic circuit 117 when the drain voltage is equal to or higher than a predetermined voltage. In other words, the charger reverse connection detection circuit 116 detects that the charger is connected to the battery 200 with its polarities being reversed to those of the battery.

Note that the pull-down resistor 28 is used in the second embodiment, but a current source (not shown) may be used.

In the second embodiment of the present invention, the n-type substrate is used, the NMOS transistor 21 and the pull-down resistor 28 are provided in order between the output terminal OUT and the ground terminal VSS, and the gate of the NMOS transistor 21 is connected to the power source terminal. In this case, two NMOS transistors are provided between the terminal EB− and the battery 200. Further, when the voltage of the detection terminal VM provided at the terminal EB− is equal to or higher than the voltage obtained by adding the threshold voltage of the parasitic diode to the power supply voltage, the charger reverse connection detection circuit 116 detects that the charger is connected to the battery 200 with its polarities being reversed to those of the battery. However, a p-type substrate (not shown) may be used, a pull-up resistor and a PMOS transistor (not shown) may be provided in order between the power supply terminal VDD and the output terminal OUT, and a gate of the PMOS transistor may be connected to the ground terminal. In such a case, two PMOS transistors are provided between the terminal EB+ and the battery. Further, when the voltage of the detection terminal VM provided at the terminal EB+ is smaller than a voltage obtained by subtracting the threshold voltage of the parasitic diode from the ground voltage, the charger reverse connection detection circuit detects that the charger is connected to the battery with its polarities being reversed to those of the battery.

Third Embodiment

Figure 7:
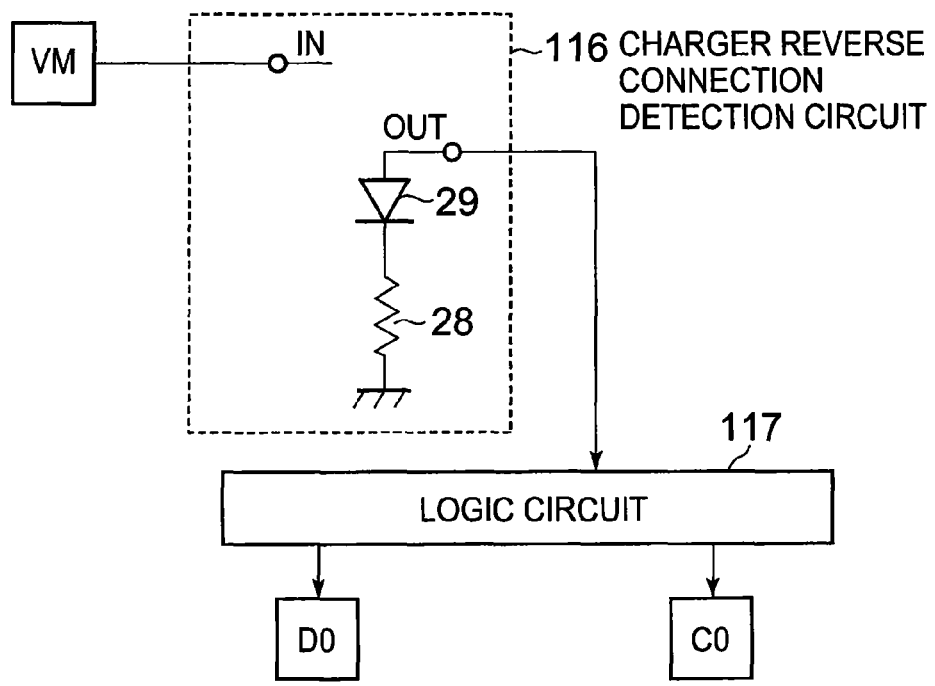
FIG. 7 is a circuit diagram illustrating still another charger reverse connection detection circuit.
Figure 8:
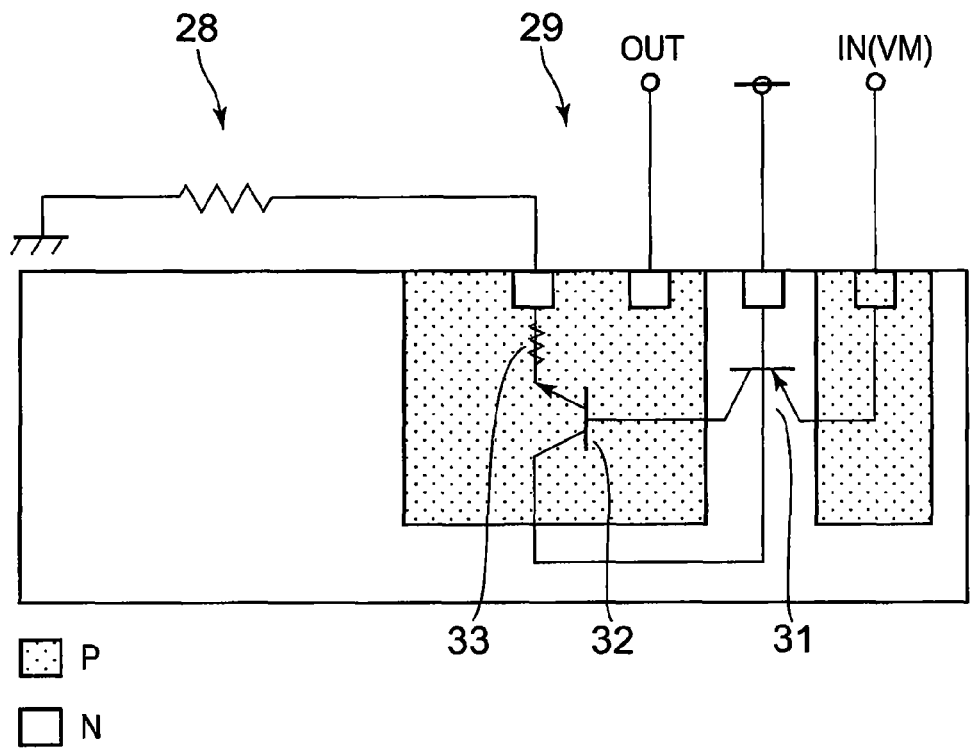
FIG. 8 is a device cross-sectional view illustrating the still another charger reverse connection detection circuit.

Next, a configuration of the charger reverse connection detection circuit 116 is described. FIG. 7 is a circuit diagram illustrating the charger reverse connection detection circuit. FIG. 8 is a device cross-sectional view illustrating the charger reverse connection detection circuit.

The charger reverse connection detection circuit 116 includes a diode 29 and a pull-down resistor 28.

Further, the charger reverse connection detection circuit 116 includes a parasitic PNP bipolar transistor 31, a parasitic NPN bipolar transistor 32, and a parasitic resistor 33.

An anode of the diode 29 is connected to the output terminal OUT, and a cathode thereof is connected to the ground terminal via the pull-down resistor 28.

In the parasitic PNP bipolar transistor 31, a base thereof is connected to the power supply terminal VDD, an emitter thereof is connected to an input terminal IN (detection terminal VM), and a collector thereof is connected to a base of the parasitic NPN bipolar transistor 32. In the parasitic NPN bipolar transistor 32, an emitter thereof is connected to one terminal of the pull-down resistor 28 via the parasitic resistor 33, and a collector thereof is connected to the power supply terminal VDD.

Next, an operation of the charger reverse connection detection circuit 116 is described.
(Case Where the Charger is Connected to the Battery 200 with its Polarities Being Reversed to Those of the Battery)

It is assumed here that, in a first parasitic diode, a p-type well connected to the input terminal IN (detection terminal VM) is an anode, and an n-type substrate connected to the power supply terminal VDD is a cathode. It is assumed that, in the parasitic PNP bipolar transistor 31, an n-type substrate connected to the power supply terminal VDD is the base, a p-type well connected to the input terminal IN (detection terminal VM) is the emitter, and a p-type well connected to the output terminal OUT is the collector. It is assumed that, in the parasitic NPN bipolar transistor 32, a p-type well connected to the output terminal OUT is the base, an n-type cathode region connected to the ground terminal via the pull-down resistor 28 is the emitter, and an n-type substrate connected to the power supply terminal VDD is the collector.

A voltage of the input terminal IN (detection terminal VM) becomes around the ground voltage, whereby the first parasitic diode does not operate, and the parasitic PNP bipolar transistor 24 does not operate as well. Then, the output terminal OUT is pulled down, and a voltage of the output terminal OUT is converted into a low signal (voltage obtained by adding the threshold voltage of the parasitic diode to the ground voltage). That is, the charger reverse connection detection circuit 116 does not detect that the charger is connected to the battery 200 with its polarities being reversed to those of the battery.

(Case Where the Charger is Connected to the Battery 200 with its Polarities Being Reversed to Those of the Battery)

A voltage of the input terminal IN (detection terminal VM) becomes high to be equal to or higher than a voltage obtained by adding the threshold voltage of the parasitic diode to the power supply voltage, whereby the first parasitic diode operates and causes a parasitic current to flow. The parasitic PNP bipolar transistor 31 operates in response to the parasitic current and causes a parasitic current to flow. When the parasitic current of the parasitic PNP bipolar transistor 31 flows through the diode 29, the parasitic NPN bipolar transistor 32 operates and causes an amplified parasitic current to flow. The amplified parasitic current flows through the parasitic resistor 33, the pull-down resistor 28, and wiring (resistance component), whereby a voltage is generated in the parasitic resistor 33, the pull-down resistor 28, and the wiring. As a result, an anode voltage of the diode 29 becomes high, and is converted into a high signal with respect to the logic circuit 117 when the anode voltage is equal to or higher than a predetermined voltage. In other words, the charger reverse connection detection circuit 116 detects that the charger is connected to the battery 200 with its polarities being reversed to those of the battery.

In the third embodiment of the present invention, the n-type substrate is used, the diode 29 and the pull-down resistor 28 are provided in order between the output terminal OUT and the ground terminal VSS. In this case, two NMOS transistors are provided between the terminal EB− and the battery 200. Further, when the voltage of the detection terminal VM provided at the terminal EB− is equal to or higher than the voltage obtained by adding the threshold voltage of the parasitic diode to the power supply voltage, the charger reverse connection detection circuit 116 detects that the charger is connected to the battery 200 with its polarities being reversed to those of the battery. However, a p-type substrate (not shown) may be used, a pull-up resistor and a diode (not shown) may be provided in order between the power supply terminal VDD and the output terminal OUT. In such a case, two PMOS transistors are provided between the terminal EB+ and the battery. Further, when the voltage of the detection terminal VM provided at the terminal EB+is smaller than a voltage obtained by subtracting the threshold voltage of the parasitic diode from the ground voltage, the charger reverse connection detection circuit detects that the charger is connected to the battery with its polarities being reversed to those of the battery.

The invention claimed is:

1. A charge and discharge control circuit formed on a second-conductivity-type substrate, for controlling charge and discharge of a battery including a second-conductivity-type first MOS transistor and a second-conductivity-type second MOS transistor which are provided on a charge and discharge path, the charge and discharge control circuit comprising:
   a detection terminal for detecting that a charger is connected to the battery with polarities thereof being reversed to polarities of the battery; and
   a charger reverse connection detection circuit comprising:
      an input terminal provided to the detection terminal;
      an output terminal;
      a first parasitic bipolar transistor including a second-conductivity-type base provided to a first power source terminal and a first-conductivity-type emitter provided to the input terminal; and
      a second parasitic bipolar transistor including a first-conductivity-type base provided to a first-conductivity-type collector of the first parasitic bipolar transistor, a second-conductivity-type emitter provided to a second power supply terminal via a resistance component, and a second-conductivity-type collector provided to the first power supply terminal,
   wherein the charger reverse connection detection circuit, when a voltage of the input terminal is equal to or higher than a voltage determined by adding a threshold voltage of a diode to a power supply voltage, operates so as to turn on the second-conductivity-type first MOS transistor which is turned on to cause a charge and discharge current to flow and is turned off to cause only a discharge current of a first parasitic diode to flow, and operates so as to turn off the second-conductivity-type second MOS transistor which is turned on to cause the charge and discharge current to flow and is turned off to cause only a charge current of a second parasitic diode to flow, to stop the discharge of the battery.

2. A charge and discharge control circuit according to claim 1, wherein the resistance component comprises an on-resistance of a second-conductivity-type third MOS transistor.

3. A charge and discharge control circuit according to claim 1, wherein the resistance component comprises an on-resistance of a second-conductivity-type third MOS transistor and a resistor.

4. A charge and discharge control circuit according to claim 1, wherein the resistance component comprises a resistor.

5. A charge and discharge control circuit according to claim 1, wherein the resistance component comprises a current source.

6. A battery device, comprising:
   a battery;
   a second-conductivity-type first MOS transistor and a second-conductivity-type second MOS transistor which are provided on a charge and discharge path of the battery; and
   the charge and discharge control circuit according to claim 1, which is provided in parallel with the battery, for controlling the second-conductivity-type first MOS transistor and the second-conductivity-type second MOS transistor.

* * * * *